United States Patent [19]
Amoroso, Jr.

[11] 4,411,018
[45] Oct. 18, 1983

[54] RAPIDLY STABILIZED GUNN OSCILLATOR TRANSCEIVER

[75] Inventor: Salvatore Amoroso, Jr., Fairfield, Conn.

[73] Assignee: United Technologies Corporation, Hartford, Conn.

[21] Appl. No.: 313,104

[22] Filed: Oct. 18, 1983

[51] Int. Cl.³ .............................................. H04B 1/40
[52] U.S. Cl. ...................................... 455/75; 455/82; 455/24
[58] Field of Search ................. 455/24, 75, 78, 80–87, 455/67, 9

[56] References Cited

U.S. PATENT DOCUMENTS

| | | | |
|---|---|---|---|
| 2,460,781 | 2/1949 | Cantelo | 455/75 |
| 2,924,703 | 2/1960 | Sichak et al. | 455/9 |
| 3,829,788 | 8/1974 | Amoroso, Jr. | 455/75 |
| 3,916,412 | 10/1975 | Amoroso, Jr. | 455/75 |
| 3,925,729 | 12/1975 | Amoroso, Jr. | 455/75 |
| 3,931,575 | 1/1976 | Amoroso, Jr. | 455/75 |
| 3,935,533 | 1/1976 | Amoroso, Jr. | 455/75 |
| 4,186,344 | 1/1980 | Higuchi et al. | 455/86 |

Primary Examiner—Jin F. Ng
Attorney, Agent, or Firm—Richard P. Lange

[57] ABSTRACT

A single channel, or push-to-talk transceiver includes a switch-controlled Gunn oscillator for generating the carrier frequency during transmission and a continuously operating local oscillator for demodulation of a received signal in the receive mode. When the push-to-talk switch is depressed, the transmit oscillator is energized and leakage signals cross the circulator to the receiver portion of the transceiver. An RF AFC loop between the transmitter and receiver portions includes a low-pass filter at the preamplifier output which serves as a simple slope discriminator. This output is detected and used to close an electronic servo loop. Once closed, this servo loop locks the transmit oscillator frequency relative to the local oscillator thereby preventing frequency drift during warm-up.

4 Claims, 1 Drawing Figure

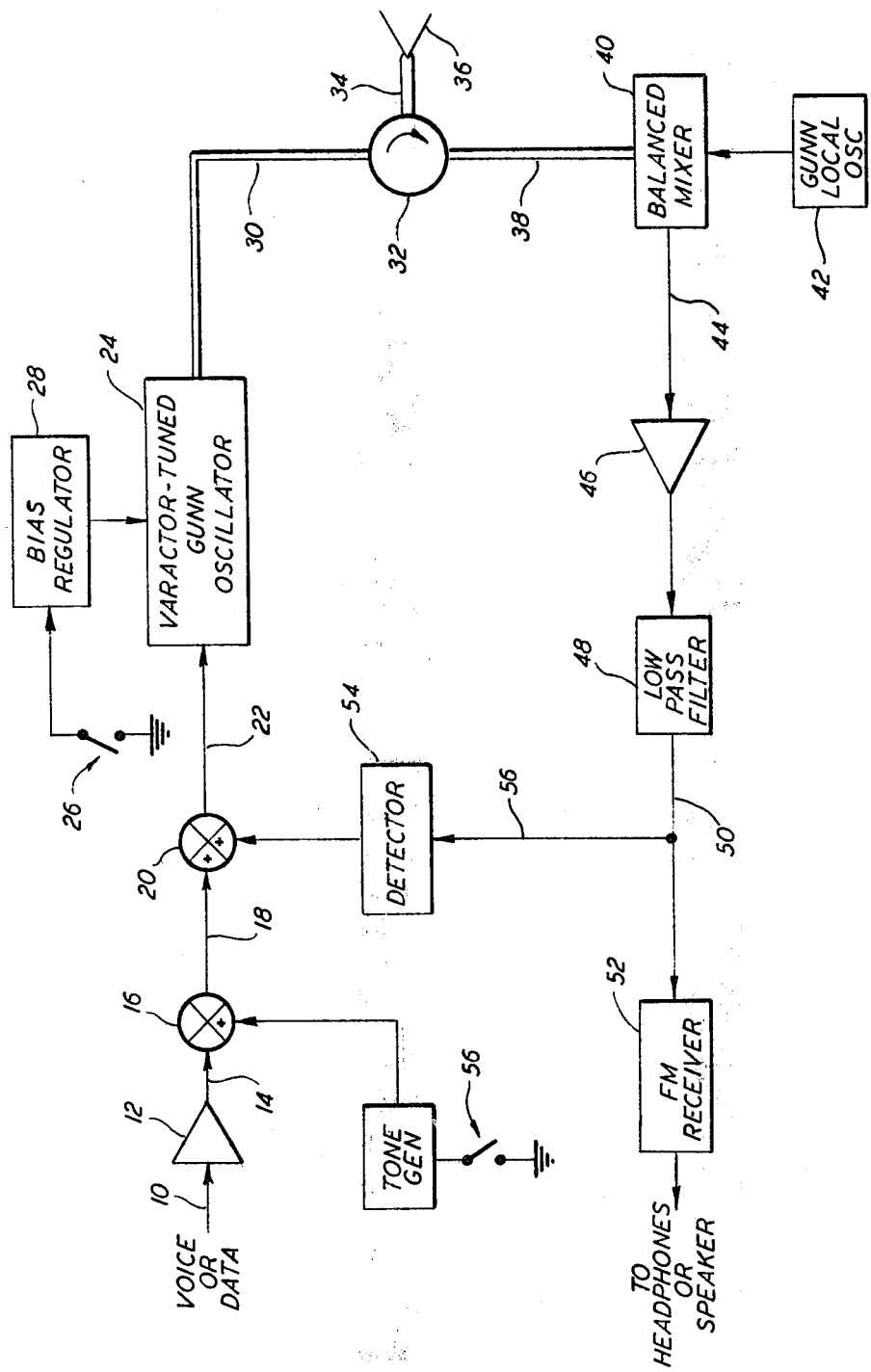

RAPIDLY STABILIZED GUNN OSCILLATOR TRANSCEIVER

DESCRIPTION

1. Technical Field

This invention relates to transceivers, and more particularly, to a single channel push-to-talk transceiver in which a feedback loop is used to minimize any frequency drift when the transmitter is keyed.

2. Background Art

Transceivers are generally known and include a transmitter and a receiver typically placed in a small package to facilitate communications between two points. Microwave transceivers utilize extremely high frequencies, recently into the millimeter wavebands, and can provide either directional or omnidirectional line of sight communications, depending on the type of antenna. Transceivers that operate in this waveband are particularly useful where relatively secured transmission is needed as well as in crowded areas such as building-to-building communications where it is necessary to minimize interference with adjacent communication systems.

One problem associated with the manufacture of transceivers in the millimeter waveband is the limited availability of components which are suitable for this frequency range. Currently, because of the very limited use of the millimeter wavebands for communications, there is a relatively small number of component manufacturers, and these manufacturers only provide a small number of very expensive components for use in millimeter transceivers. This means that the final cost of such a transceiver with the currently available components tends to be quite expensive, compared to those widely available transceivers which operate in the lower frequency bands.

The use of feedback loops in lower frequency transceivers is known. For example, U.S. Pat. No. 2,460,781 issued Feb. 1, 1949 to H. Cantelo for CIRCUIT FOR STABILIZING FREQUENCY OF TRANSMITTER-RECEIVER SYSTEMS describes a stabilizing means in a lower frequency radio. An oscillator includes a feedback loop that automatically stabilizes the transmitting oscillator in accordance with the drift of the transmitter. While this circuit design may be suitable for operation at lower frequency, it is not realistically feasible to scale up this design to the millimeter operating frequency. In fact, many of the components used in this design are simply not available in the millimeter frequency band.

Of general interest for their teachings of transceivers that operate in millimeter wavebands are U.S. Pat. No. 3,916,412 issued Oct. 28, 1975 to S. Amoroso, Jr. for FREQUENCY STABILIZED SINGLE OSCILLATOR TRANSCEIVERS, U.S. Pat. No. 3,925,729 issued Dec. 9, 1975 to S. Amoroso, Jr. for SKIRT-TUNED SINGLE OSCILLATOR TRANSCEIVER, U.S. Pat. No. 3,935,533 issued Jan. 27, 1976 to S. Amoroso, Jr. for SINGLE OSCILLATOR MICROWAVE TRANSCEIVER, and U.S. Pat. No. 3,931,575 issued Jan. 6, 1976 to S. Amoroso, Jr. for FILTER STABILIZED SINGLE OSCILLATOR TRANSCEIVER, all of which are assigned to the same assignee as the present invention. The transceivers described in these patents are capable of operating in the millimeter range but they do not describe a means for rapidly correcting the frequency drift of the transmitter oscillator in push-to-talk operation.

DISCLOSURE OF INVENTION

An object of the present invention is to provide a minimum complexity transceiver which includes a solid-state (i.e., Gunn type) oscillator and an RF AFC feedback loop that is instantaneously stabilized in push-to-talk operation.

A particular feature of the present invention is that a simple, yet effective feedback loop in a single channel millimeter transceiver prevents frequency drift during warm-up of the transmitter oscillator. Because in push-to-talk operation the transmit oscillator is normally unenergized, once the talk switch is depressed the frequency of the transmitter can drift during the warm-up period. However, the feedback loop locks the transmit oscillator frequency to a fixed offset relative to the already operating receive oscillator frequency. This feedback loop is quite fast and therefore eliminates frequency drift of the transmitter oscillator.

According to the present invention, a transceiver employing a Gunn oscillator includes an RF AFC loop for preventing frequency drift during push-to-talk operation. When the transmitter is energized, leakage signals cross the circular and enter the mixer resulting in an IF signal being generated in the wideband preamplifier. A low-pass filter at the preamplifier output serves as a simple slope discriminator and this output is detected and used to close an electronic servo loop. Once closed, this servo loop locks the transmit oscillator frequency to a fixed offset relative to the local oscilator frequency. An AGC loop is also included which prevents the preamp from being overloaded by leakage from the transmitter as well as normalizing the AFC error signal. This feedback loop is quite fast and therefore eliminates frequency drift once the push-to-talk switch is energized.

The foregoing and other objects, features and advantages of the present invention will become more apparent from the following description of preferred embodiments and accompanying drawings.

BRIEF DESCRIPTION OF DRAWING

The sole FIGURE is a block diagram depicting one embodiment of the rapidly stabilized Gunn oscillator transceiver according to the present invention.

BEST MODE FOR CARRYING OUT THE INVENTION

Referring now to the drawing, there is seen one embodiment of a rapidly stabilized Gunn oscillator transceiver according to the present invention. Information to be transmitted, by voice, data or video, are applied on a line 10 to an amplifier 12. As will be appreciated, the input signals may be analog signals (such as voice and video) or may be digital signals depending on the application of the particular use for the transceiver. Voice information is the most often used type of input employed where the transceiver is operating as a simplex or one-way communications device. The output from the amplifier 12 is connected by a line 14 to one input of a summer 16. The other input to the summer 16 is from a test system which will be described in greater detail hereinafter. The output from the summer 16 is on a line 18 to one input of a summer 20. From the summer 20 the signal is presented along a line 22 to the input of a solid-state oscillator 24. In the embodiment of the present invention, a Gunn-type oscillator is preferably used as the transmit oscillator. However, it should be understood that there are other types of oscillators which could also be used. For example, an IMPATT diode oscillator or a gas FET diode oscillator could also be used.

The Gunn oscillator 24 is a varactor tuned, solid-state oscillator which serves as the source of the carrier frequency for the transmitter. The Gunn oscillator 24 is normally off but is energized by keying a switch 26 which through a bias regulator 28 provides a DC signal to the Gunn oscillator 24. The RF output from the Gunn oscillator 24 is applied by a suitable microwave transmission line 30 to one port of a circulator 32. Circulator 32 is a three-port device having a predetermined amount of coupling between ports. The bulk of the energy presented to the circulator 32 from the transmission line 30 is coupled as shown by the arrow to the port connected to the transmission line 34. An antenna 36 is connected to the outward end of the transmission line 34 and serves as a transmit and receive aperture for the high frequency microwave signals. The description of the transceiver to this point has been basically of the transmit half and, as mentioned, is normally energized only when the switch 26 is keyed.

Referring to the lower portion of the drawing, the receive half of the rapidly stabilized Gunn oscillator transceiver according to the present invention will now be described. When the transceiver is on, and unless the switch 26 is keyed, the receiver portion is normally operating. An RF signal received at the antenna 36 is coupled along the waveguide 34 to one port of the circulator 32. This energy is coupled in the direction indicated by the arrow to the third port of the circulator 32 and the transmission line 38. A balanced mixer 40 has presented thereto a demodulating or local oscillator signal from a second Gunn oscillator 42. As the second Gunn oscillator 42 is on at all times when the transceiver is on, it is normally stabilized by a temperature sensitive resistor (not shown) which senses the oscillator body temperature. The output from the mixer is applied along a line 44 to a preamplifier 46 designed to interface with the output of the balanced mixer 40. A low-pass filter 48 at the output of the preamplifier 46 limits the bandpass characteristic of the receive signal and presents it along a line 50 to an FM receiver 52.

A particular feature of the present invention is a feedback loop which stabilizes the Gunn oscillator 24 during the short period after which the switch 26 is depressed, energizing the transmit portion of the transceiver. As mentioned, without some stabilization means, a relatively large frequency drift of the Gunn oscillator 24 occurs during warm-up, or the brief period after the switch 26 is depressed. In accordance with the present invention, a RF AFC loop is provided to stabilize the Gun transmit oscillator 24 from the continuously operating lower powered Gunn local oscillator 42. The feedback loop includes an AFC detector and amplifier 54 which is connected by a transmission line 56 to the output of the low-pass filter 48. The output from the AFC detector and amplifier 54 is connected back through one input of the summer 20 to the input of the Gunn oscillator 24. The AFC detector and amplifier 54 together with the low-pass filter 48 and the preamplifier 46 serves as a simple slope discriminator which locks or slaves the output frequency of the Gunn oscillator 24 by a fixed offset to the Gunn oscillator 42. When the switch 26 is keyed on, the summer 20 receives a large positive voltage which drives the frequency of the Gunn oscillator higher. In turn, this lowers the difference frequency. As the difference frequency between the transmitted frequency and that of the Gunn oscillator 42 continues to decrease until the band edge of the low-pass filter 48 is reached. At this band edge an IF signal is generated and detected. This detected signal is the error signal which is fed back to the input of the Gunn oscillator 24 and keeps the transmit frequency locked to that of the local oscillator.

Another feature of the present invention is a simple but effective test system which can be included in the transceiver. The test system includes a tone generator 54 which is coupled to one input of the summing amplifier 16. A switch 58 enables the tone generator 54 and a tone is presented to the input of the Gunn oscillator 24. A portion of this signal is passed by the leakage in the circulator 32 and when received at the FM receiver 52 would provide a go-no-go indicator. The indicator at the FM receiver 52 could be a tone heard in an earphone or a light mounted on the body of the transceiver.

Although this invention has been shown and described with respect to a preferred embodiment, it will be understood by those skilled in this art that various changes in form and detail thereof may be made without departing from the spirit and scope of the claimed invention.

I claim:

1. A single-channel transceiver having a transmitter portion that is enabled in a push-to-talk mode and a receiver portion that normally operates in an on state, comprising:
   a first microwave oscillator means, in said transmitter portion, having an input thereto that proportionally changes the frequency of oscillation, for creating a transmit frequency in the millimeter band;
   antenna means for transmitting and receiving microwave energy;
   circulator means connecting said antenna to both said transmitter portion and said receiver portion;
   mixer means having a second microwave oscillator means that is normally in the on state, said mixer means being connected to said circulator means for demodulating a received microwave signal; and
   a feedback loop connected between said receiver portion and said transmitter portion which includes a slope discriminator means and a frequency discriminator means to provide a voltage level which varies proportionally to the frequency difference between leakage signals from said first microwave oscillator means and said second oscillator means to provide an error signal which is fed back to the input of said transmitter oscillator means.

2. A single-channel transceiver according to claim 1, wherein said first microwave oscillator means is a solid-state, Gunn oscillator having its input connected to a summing node and wherein said feedback loop presents a voltage level to said summing node which is proportional to the frequency drift of said Gunn oscillator during warm-up, if any.

3. A single-channel transceiver according to claim 2, wherein said feedback loop includes a low-pass filter and a frequency discriminator that serve as a simple slope discriminator for closing the feedback loop.

4. A single-channel transceiver according to claim 1, further including a tone generator means connectable to said input of said first microwave oscillator means for providing a test tone thereto which when received in said receiver portion indicates the proper operation of said transceiver.

* * * * *

UNITED STATES PATENT AND TRADEMARK OFFICE
CERTIFICATE OF CORRECTION

PATENT NO. : 4,411,018

DATED : October 18, 1983

INVENTOR(S) : SALVATORE AMOROSO, JR.

It is certified that error appears in the above-identified patent and that said Letters Patent is hereby corrected as shown below:

Page 1, line 10, after "Filed:" change "Oct. 18, 1983" to -- Oct. 20, 1981 --

Column 2, line 26, change "circular" to -- circulator --

Signed and Sealed this

Seventeenth Day of July 1984

[SEAL]

Attest:

GERALD J. MOSSINGHOFF

Attesting Officer     Commissioner of Patents and Trademarks